Patented Jan. 26, 1954

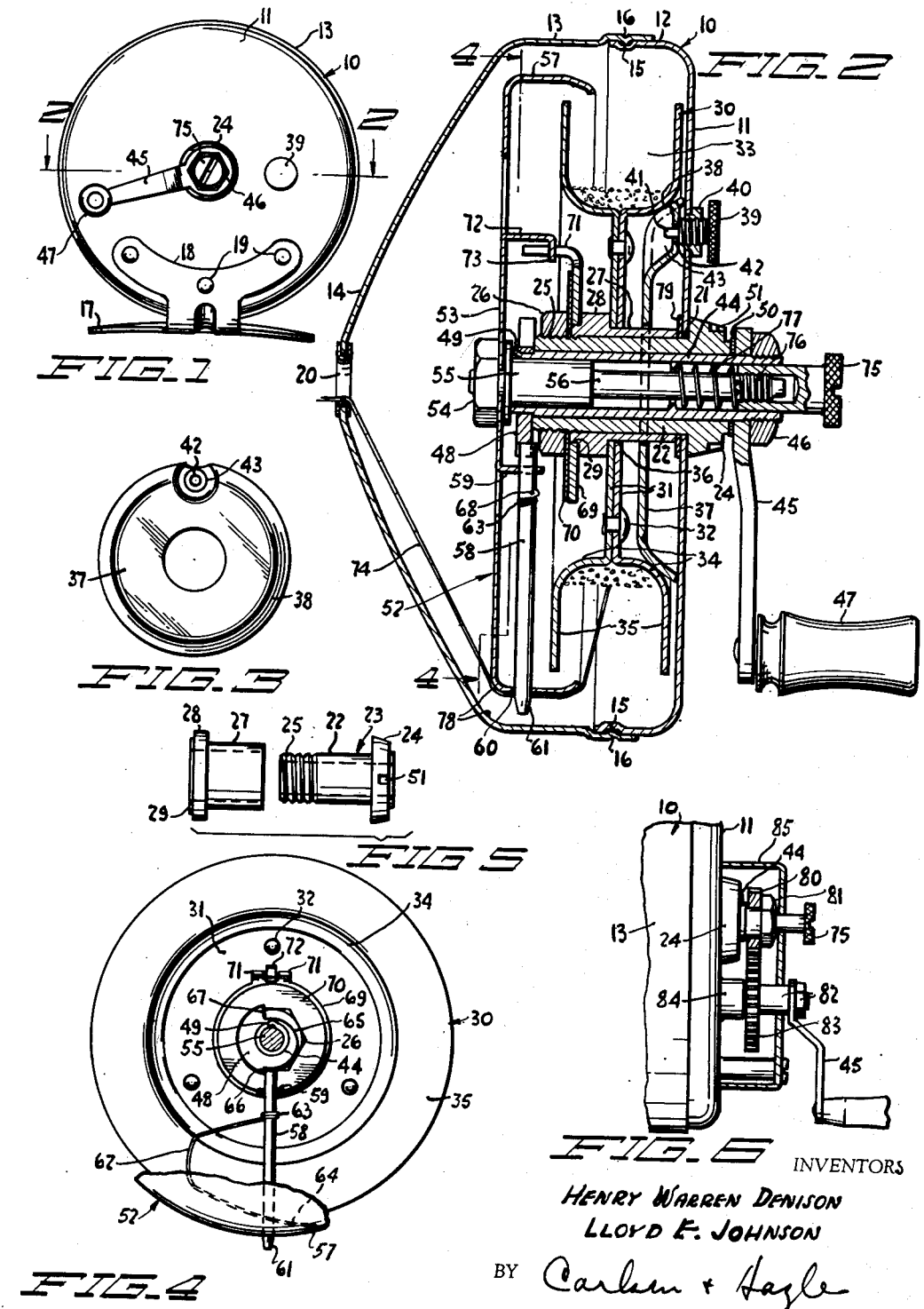

2,667,312

UNITED STATES PATENT OFFICE 2,667,312

FISHING REEL

Henry Warren Denison and Lloyd E. Johnson, Mankato, Minn., assignors to Denison-Johnson, Inc., Mankato, Minn., a corporation of Minnesota Application September 19, 1951, Serial No. 247,304

6 Claims. (Cl. 242—84.5)

This invention relates to improvements in fishing reels of the fixed spool variety, popularly known as spinning reels, and more particularly to improvements in the reel disclosed in our prior application Serial No. 179,188, filed August 14, 1950, now Patent No. 2,644,647, issued July 7, 1953.

As in that prior application the reel here disclosed includes a fixed spool and a crank actuated, rotatable spooling member which picks up and spools the line as the crank is turned. When casting, a centrally located control member is pressed so as to shift the spooling member and retract a line pick-up pin, which normally projects from the periphery thereof, so that the line may peel off from the spool without any possibility of forming a backlash. Our present invention has as its primary object the improvement of the center bearing and mounting mechanism for supporting the spool and spooling member, with the component parts of this mechanism so constructed and arranged that the reel may be taken down or reassembled in the field without difficulty.

Another object of the present invention is to provide improved brake and drag mechanisms for retarding movement of the spool and spooling member, respectively, as necessary in certain operations of the reel.

Still another object is to provide a gear drive mechanism for a reel of this type by which the lure retrieve speed may be accelerated, and to generally improve various constructional and operational features of this reel, all as will be set out in detail hereafter.

These and other more detailed and specific objects will be disclosed in the course of the following specification, reference being had to the accompanying drawings, in which—

Fig. 1 is a side elevational view of a reel according to our invention, looking at the same from the side at which the actuating crank is located.

Fig. 2 is an enlarged diametric sectional view taken substantially along the line 2—2 in Fig. 1.

Fig. 3 is an elevational view on a reduced scale as compared with Fig. 2, and showing the brake disk or member for braking the reel spool.

Fig. 4 is a sectional and elevational view on a reduced scale taken substantially along the line 4—4 in Fig. 2 viewing the spool in end elevation and showing only a fragmentary peripheral portion of the spooling member.

Fig. 5 is an elevational view of the tubular bearing and sleeve members forming major supporting parts for the reel assembly.

Fig. 6 is a fragmentary plan view of one side portion of the reel, illustrating the application thereto of gears for speeding up the lure retrieve and showing the housing for this gear assembly in section.

Referring now more particularly and by reference characters to the drawing, the reel comprises a frame in the form of a hollow housing, designated generally at 10, consisting of a circular side plate 11 having a peripheral flange 12 over which is fitted the rim 13 of a conical cover 14. The engagement between the rim 13 and flange 12 is frictional, but in addition the flange is provided with bayonet grooves 15, while the rim has pressed in bosses 16 to engage these grooves on rotational movement of the cover to lock the two component parts of the frame firmly together. The usual tang 17 is secured to the side plate 11 by a bracket 18, riveted to the plate and designated at 19, and this tang serves as means for securing the reel to the reel seat on the fishing rod. It will be noted that the tang 17 is so located with reference to the frame or housing 10 that the side plate 11 will parallel the axis of the fishing rod when the reel is applied thereto. The cover 14 has a line guide eyelet 20 at its apex and thus the line, which flows out through this eyelet as will be presently described, will emerge from the side of the reel.

At its center the side plate 11 has an opening 21 and fitted therein is the barrel 22 of a tubular bearing member 23 which has a diametrically enlarged head 24 at its outer end to overlie the outer face of the side plate. The opposite end of the bearing member 23 is externally threaded at 25 for the accommodation of a clamping nut 26. In assembly a sleeve 27 is slipped over the barrel portion 22 of the bearing member and is held in place by the nut 26, this sleeve also having a diametrically enlarged annular shoulder 28 adjacent its inner end and which shoulder is in turn faced off to provide a narrow, reduced projection 29. The reel spool is designated generally at 30 and comprises two identical pressed sections, the center portions 31 of which are held together by rivets 32 and the peripheral portions of which are oppositely offset in order to form the annular line receiving groove 33. Where these spool sections are offset they are rounded, as designated at 34, and from these offsets the spool sections extend radially in parallel flanges, as designated at 35, to form the aforesaid groove 33. The centers 31 of the spool sections have openings 36 of a diameter such as to nicely, rotatably fit the sleeve 27 on which the spool is mounted, with the aforesaid shoulder 28 forming a stop to prevent endwise movement of the spool in the inward direction. The spool is frictionally biased in the said inward direction and held against the shoulder 28 by a dished brake disk or member 37 pressed from sheet metal and circular in shape to fit the circular cavity at the adjacent side of the spool formed by said offset 34. Around its margin the brake member 37 is curved, as indicated at 38, and in assembly this curved rim of the brake member will bear against the adjacent and oppositely curved offsets 34 of the reel spool as clearly shown in Fig. 2. The brake member 37 is held against rotation and adjusted in its frictional contact with the spool by means of a knurled screw 39 threaded through an insert 40 in the side plate 11 and having a reduced inward projection 41 which fits an opening 42 formed for its accommodation in a circular offset portion 43 of the brake member. It will be readily understood that the adjustment of the screw 39 will press the brake member 37 inward against the spool so as to frictionally hold the same against rotation and that the magnitude of the frictional resistance of rotation of the spool may be readily adjusted by the angler simply by turning the screw 39, for a purpose presently to appear.

Journaled through the bearing member 23 is a tubular shaft 44, the length of which is such that the outer end of the shaft will project some distance beyond the bearing head 24 to the outside of the reel. This outer end of the shaft is provided with the conventional flats for the accommodation of a crank 45 which is held in place by a crank nut 46 threaded on the outer end of the shaft. The crank, of course, has the usual knob 47 by which it, and the shaft to which it is connected, may be rotated by the angler. A cam 48 is fitted on the slightly reduced inner end of the shaft 44 to which the cam is non-rotatably located by staking, as designated at 49, and in assembly, as the crank nut 46 is turned up, the shaft will be held against endwise displacement in the bearing, but one or more thin washer-shaped shims, such as designated at 50, may be located between the crank and the head 24 of the bearing in order to take up any end play which may be present.

It will be noted that the end face of the bearing head 24 is diametrically reduced to reduce friction as the crank is turned, and that the head is also provided with opposed notches 51 so that the bearing may be held against turning by means of a small spanner (not shown) while the nut 26 is turned up tight in assembling the reel.

Positioned alongside the spool 30 is a circular spooling member, designated generally at 52, formed up from sheet metal and with its circular end plate 53 firmly secured by means of a nut 54 against the enlarged end 55 of an elongated operating plunger 56. This enlarged end 55 of the plunger is of such diameter as to slidably and rotatably fit the bore of the shaft 44 into which the plunger is inserted, so as to hold the spooling member 52 centered with respect to the spool itself. Around its margin the end plate 53 of the spooling member has an annular flange 57 encircling the adjacent flange 35 of the spool 30 and with its extremities smoothly rounded off. In the casting position, the spooling member moves out so that edge of flange 57 is even with the edge of spool 30 allowing line to peel off, without restriction, from spool 30. In the spooling position, the edge of the flange of the spooling member projects well over the center of the spool 30 which permits line to be wound evenly from the center of the spool each way. A line pick-up pin 58 is slidably mounted in a radial position within the spooling member 52 and for this purpose an apertured ear 59 is punched from the end plate 53 to support the inner end of the pin, while the flange 57 is provided with an opening 60 through which the smoothly tapered outer end 61 of the pin slidably projects. At its inner end the pin 58 rides the periphery of the cam 48 and a bowed wire spring 62 is attached at one end 63 to the pin and braced at its outer end 64 against the flange 57 in order to yieldably bias the pin in the inward direction to maintain its inner end in contact with the cam. Substantially one-half of the periphery of the cam 48 is constituted by an eccentric cam surface 65 terminating in shoulders 66 and 67, and this cam surface 65 is so formed that rotation of the cam by the crank 45, in a normal direction in which said crank is turned for retrieving the fishing line, will bring up the "high" point of the cam and project the pin 58 from the spooling member 52 as seen in Figs. 2 and 4. At the same time as the shoulder 66 comes up against the inner end of the pin 58, it will cause the cam to rotate the spooling member 52 with the crank, as will be understood. Inward movement of the pin 58 is limited by the contact of a small lug 68 with the apertured ear 59, and as seen in Fig. 2 said lug is punched from the pin itself in a well known manner.

In assembly a circular drag plate 69 is fitted on the projection 29 of the sleeve 27 and rotatably held thereon by the nut 26 which holds the bearing assembly together, but interposed between the nut and drag plate 69 is a circular spring washer 70 of Phosphor bronze or other suitable material. Before assembly the washer 70 is slightly crimped or bowed, and thus as the nut 26 is turned up tight the washer will tend to frictionally hold the drag plate 69 against rotation on the stationary bearing assembly. The plate 69 has right angularly turned, spaced fingers 71 which project out toward the end plate 53 of the spooling member and punched from this end plate 53 is a cooperating finger 72 having an end 73 fitting between this finger 71. The finger 72 may, of course, pull clear as the spooling member is removed from the assembly as will be understood.

In operation the spool 30 is filled with fishing line, designated at 74, and with the parts assembled as described the end of the line is pulled off of the spool of the flange 57 of the spooling member 52 and out through the guide 20, so that the line may be threaded through the guides of the fishing rod and attached to the lure. In order then to cast the lure the angler depresses a control button 75, which enters the open end of the shaft 44 and is threaded at 76 onto the plunger 56, forcing this plunger inward against the outward tension of a coil spring 77 encircling the plunger as clearly shown. This motion of the plunger 56 moves the spooling member 52 a short distance away from the spool 30 and as the pin 58 thus is moved clear of the cam 48 the spring 62 will move the pin inward toward the center of the reel so that its end 61 clears the line where it passes over the flange 57. As will be readily understood the line 74 may then peel off the spool 30 as is necessary in making the cast. The aforesaid movement of the control button 75 may be caused to move the spooling member 52 far enough to frictionally grip or pinch the line 74 between the cooperating annular surfaces 78 of the spooling member 52 and cover 14, so as to control both the start and the end of the cast. In our previous application the line was controlled for this purpose where it passed out through the eyelet or guide 20, but we find the present arrangement, by which the line is controlled out at the margin of the spooling member, to be preferable, particularly where comparatively heavy monofilament fishing lines are employed.

To reel in the line it is only necessary to turn the crank 45 in the normal direction for this purpose and the first part of a turn in this direction will cause the "low" spot on the cam surface 65, adjacent the shoulder 67, to move into alignment with the pick-up pin 58 whereupon the spring 77 will urge the spooling member back to its starting position shown in Fig. 2. Continued movement of the crank 45 will then cause the cam surface 65 to again ride the pick-up pin 58 out to its projecting position and its outer end 61 will then pick up and re-spool the line. It is, of course, necessary that rotation of the spooling member 52 be frictionally retarded so that there will be relative movement between the cam and the spooling member as the pick-up pin is thus brought back into operation, and it is for this purpose that the drag plate 69 is provided, the same frictionally connecting the spooling member to the stationary bearing assembly. This frictional drag upon the spooling member also operates to prevent the unwanted outward flow of the fishing line, as will be understood.

During normal casting operation the reel operates as a fixed spool reel in the manner of the true spinning reel, but should the lure strike an obstruction in the water while trolling, or a heavy fish pull on the line, the brake member 37 will permit the spool 30 to turn as necessary to permit the line to pull outward. The tension on the line necessary to bring about this operation is permitted by the screw 39 and it will be apparent that the spool may rotate for paying out the line under these conditions even while the crank 45 is held stationary, or is being turned in a direction for retrieving the line. The importance and advantage of this action will be well understood by those skilled in the art.

The bearing assembly here provided permits the reel to be assembled or disassembled in the field without the use of any special fixtures or tools and to disassemble the reel the cover plate 14 is first removed, following which the control button 75 is unscrewed so that the spooling member 52 and attached plunger 56 may be withdrawn from the bearing assembly. The crank nut 46 is next removed and the crank 45 and shaft 44 may be removed permitting access to the nut 26 which, as it is taken off, disassembles the bearing parts 23—27 so that the spool 30 and brake member 37 may be taken apart. This procedure is reversed for assembling the reel and it will thus be apparent that the operation is extremely simple. As seen in Fig. 2 a washer 79 is provided between the sleeve 27 and side plate 11 to stiffen the reel at this point.

The reel as thus far described has, of course, a one-to-one ratio between the crank 45 and the parts rotated thereby and in order to speed the lure retrieve, we may employ a gear drive for the shaft 44, as seen in Fig. 6. In this case a pinion 80 is secured to the shaft 44 by a nut 81 and the crank 45 is attached at 82 to a larger drive gear 83, carried by a bearing 84 here shown for convenience as on the adjacent side plate 11 of the frame 10. The increase in speed of the shaft 44 by this gear drive will be apparent and the gears may be enclosed by a small housing 85 secured to the side wall 11 in any suitable manner conventional in the reel art. The control button 75 will, of course, project from the shaft 44 and through this housing 85 as clearly shown.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a fishing reel of the character described, a frame having a side plate and said plate having a centrally located opening, a tubular bearing in said opening, a sleeve on the bearing, a nut threaded on the bearing and securing the bearing and sleeve in place on the side plate, a line guide on the frame opposite the side plate and centered on the axis of the bearing, a line spool rotatable on the sleeve, a tubular shaft journaled through the bearing, a crank operatively connected to the shaft outside the frame, a cam secured on the shaft inside the frame, a line spooling member positioned alongside the spool and a plunger secured to the spooling member and slidably mounted out through the shaft, a control button secured on the plunger and projecting from the shaft outside the frame for manual operation to shift the line spooling member away from the spool, a pick-up pin slidably mounted on and radially projecting from the spooling member and normally engaging the cam but disengageable therefrom as said member is moved away from the spool, a spring urging the spooling member toward the spool, a second spring for urging the pin inward as it clears the cam, a brake disk and spring held by the said nut to said sleeve, and a connection between the spooling member and the brake disk to frictionally retard rotation of the member.

2. In a fishing reel of the character described, a frame having a side plate and said plate having a centrally located opening, a tubular bearing in said opening, a sleeve on the bearing, a nut threaded on the bearing and securing the bearing and sleeve in place on the side plate, a line guide on the frame opposite the side plate and centered on the axis of the bearing, a line spool rotatable on the sleeve, a tubular shaft journaled through the bearing, a crank operatively connected to the shaft outside the frame, a cam secured on the shaft inside the frame, a line spooling member positioned alongside the spool and a plunger secured to the spooling member and slidably mounted out through the shaft, a control button secured on the plunger and projecting from the shaft outside the frame for manual operation to shift the line spooling member away from the spool, a pick-up pin slidably mounted on and radially projecting from the spooling member and normally engaging the cam but disengageable therefrom as said member is moved away from the spool, a spring biasing the spooling member toward the spool, a spring biasing the pick-up pin inward against the cam, the said sleeve having an annular shoulder, a drag plate rotatable on said shoulder, a spring disk clamped by the nut against the drag plate to retard rotation thereof, and means connecting the spooling member to the drag plate.

3. In a fishing reel of the character described, a frame having a side plate and said plate having a centrally located opening, a tubular bearing in said opening, a sleeve on the bearing, a nut threaded on the bearing and securing the bearing and sleeve in place on the side plate, a line guide on the frame opposite the side plate and centered on the axis of the bearing, a line spool rotatable on the sleeve, a tubular shaft journaled through the bearing, a crank operatively connected to the shaft outside the frame, a cam secured on the shaft inside the frame, a line spooling member positioned alongside the spool and a plunger secured to the spooling member and slidably mounted out through the shaft, a control button secured on the plunger and projecting from the shaft outside the frame for manual operation to shift the line spooling member away from the spool, a pick-up pin slidably mounted on and radially projecting from the spooling member and normally engaging the cam but disengageable therefrom as said member is moved away from the spool, a spring biasing the spooling member toward the spool, a spring biasing the pick-up pin inward against the cam, the said sleeve having an annular shoulder, a drag plate rotatable on said shoulder, a spring disk clamped by the nut against the drag plate to retard rotation thereof, spaced fingers projecting from the drag plate, and a finger on the spooling member fitting between said spaced fingers whereby the drag plate will frictionally retard rotation of the spooling member.

4. In a fishing reel of the character described, a frame having a side plate and said plate having a centrally located opening, a tubular bearing in said opening, a sleeve on the bearing, a nut threaded on the bearing and securing the bearing and sleeve in place on the side plate, a line guide on the frame opposite the side plate and centered on the axis of the bearing, a line spool rotatable on the sleeve, a tubular shaft journaled through the bearing, a crank operatively connected to the shaft outside the frame, a cam secured on the shaft inside the frame, a line spooling member positioned alongside the spool and a plunger secured to the spooling member and slidably mounted out through the shaft, a control button secured on the plunger and projecting from the shaft outside the frame for manual operation to shift the line spooling member away from the spool, a pick-up pin slidably mounted on and radially projecting from the spooling member and normally engaging the cam but disengageable therefrom as said member is moved away from the spool, a spring biasing the spooling member toward the spool, a spring biasing the pick-up pin inward against the cam, the said sleeve having an annular shoulder, a drag plate rotatable on said shoulder, a spring disk clamped by the nut against the drag plate to retard rotation thereof, spaced fingers on the drag plate projecting toward the spooling member, and a member on said spooling member projecting toward and between said fingers whereby the drag plate will frictionally retard rotation of the spooling member.

5. In a fishing reel of the character described, a frame having a side plate and a conical cover mounted thereon, a bearing assembly in the frame, a line spool on the bearing assembly, a spooling member alongside the line spool and having a retractable line spooling pick-up pin, means for supporting and operating the line spooling member, the spool having a hollow on the side facing the inside of the side plate, a dished brake plate located in said hollow in frictional engagement with the spool, said plate and spool having reversely curved engaging surfaces, and means for adjusting the frictional contact of the brake plate with the spool.

6. In a fishing reel of the character described, the combination comprising a hollow frame, a bearing assembly and a line spool in the frame, a spooling member on the frame for causing a line to be wound on the spool and guiding the line off the spool and means supporting the member for movement away from the spool and toward an adjacent inner portion of the frame as line flows off the spool, and said inner portion of the frame and said spooling member having cooperating surfaces located radially outward with respect to the spool for snubbing the line upon such movement of the spooling member.

HENRY WARREN DENISON.
LLOYD E. JOHNSON.

References Cited in the file of this patent

UNITED STATES PATENTS

| Number | Name | Date |
|---|---|---|
| 1,114,084 | Wells | Oct. 20, 1914 |
| 2,521,543 | Shakespeare et al. | Sept. 5, 1950 |

FOREIGN PATENTS

| Number | Country | Date |
|---|---|---|
| 470,695 | Great Britain | Aug. 19, 1937 |
| 916,877 | France | Aug. 26, 1946 |